(12) United States Patent
Kusaka

(10) Patent No.: US 7,156,693 B2
(45) Date of Patent: Jan. 2, 2007

(54) ELECTRONIC APPARATUS WITH POINTING DEVICE ON THE HOUSING

(75) Inventor: Hiroyuki Kusaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/635,631

(22) Filed: Aug. 5, 2003

(65) Prior Publication Data

US 2004/0142593 A1   Jul. 22, 2004

(30) Foreign Application Priority Data

Jan. 22, 2003   (JP)   ............... P2003-013377

(51) Int. Cl.
*H01R 3/00*   (2006.01)
(52) U.S. Cl. .................... 439/488; 345/173
(58) Field of Classification Search ............. 439/488; 345/167, 905, 156–157, 163, 160, 173–178; 361/740, 687, 683
See application file for complete search history.

(56) References Cited

U.S. PATENT DOCUMENTS

| | | | |
|---|---|---|---|
| 5,973,622 A * | 10/1999 | Chiang | 341/22 |
| 6,177,924 B1 | 1/2001 | Bae | |
| 6,219,038 B1 | 4/2001 | Cho | |
| 6,377,456 B1 * | 4/2002 | Mohi et al. | 361/687 |
| 6,392,877 B1 * | 5/2002 | Iredale | 361/683 |
| 6,587,231 B1 * | 7/2003 | Sung | 358/497 |
| 6,670,950 B1 * | 12/2003 | Chin et al. | 345/173 |
| 6,674,425 B1 * | 1/2004 | Louis et al. | 345/173 |
| 6,700,692 B1 * | 3/2004 | Tonar et al. | 359/265 |
| 6,798,882 B1 * | 9/2004 | Kupiainen | 379/433.04 |
| 6,824,321 B1 * | 11/2004 | Ward et al. | 400/479 |
| 6,839,430 B1 * | 1/2005 | Kwak | 379/433.01 |
| 6,904,300 B1 * | 6/2005 | Maattanen et al. | 455/575.1 |
| 2002/0054115 A1 * | 5/2002 | Mack et al. | 345/765 |
| 2005/0057526 A1 * | 3/2005 | Kinoshita et al. | 345/173 |
| 2005/0146516 A1 * | 7/2005 | Nishiyama | 345/176 |
| 2005/0259069 A1 * | 11/2005 | Baker et al. | 345/156 |

FOREIGN PATENT DOCUMENTS

| | | |
|---|---|---|
| EP | 0 987 649 | 3/2000 |
| JP | 11-212665 | 8/1999 |
| JP | 2002-149338 | 5/2002 |
| JP | 2002-297309 | 10/2002 |
| JP | 2002-329978 | 11/2002 |

OTHER PUBLICATIONS

European Search Report as issued in European Application No. 03017302, Mailing date Apr. 18, 2006.

* cited by examiner

*Primary Examiner*—Tulsidas C. Patel
*Assistant Examiner*—Phuongchi Nguyen
(74) *Attorney, Agent, or Firm*—Foley & Lardner LLP

(57) ABSTRACT

An electronic apparatus has a housing and a pointing device. The housing has an outside wall that includes an outer surface exposed outward of said housing, and an operation area in the outer surface. The pointing device has a flat input surface laid on the inner surface of the operation area, and the flat input surface receives input operations through the operation area.

22 Claims, 6 Drawing Sheets

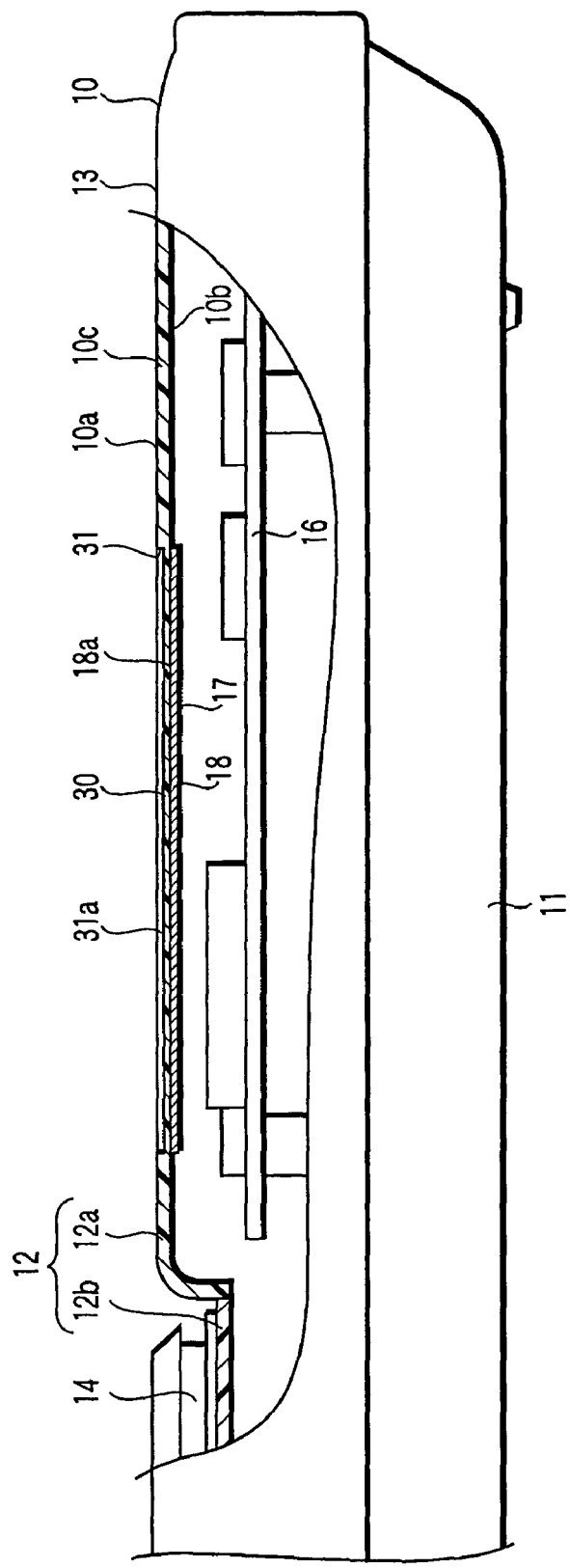
F I G. 2

ELECTRONIC APPARATUS WITH POINTING DEVICE ON THE HOUSING

CROSS-REFERENCE TO RELATED APPLICATIONS

This application is based upon and claims the benefit of priority from Japanese Patent Application No. 2003-13377, filed Jan. 22, 2003, the entire contents of which are incorporated herein by reference.

BACKGROUND OF THE INVENTION

1. Field of the Invention

This invention relates to an electronic apparatus, such as a portable computer, which includes a pointing device having a flat input surface.

2. Description of the Related Art

Among known electronic apparatuses, such as portable computers, is a type that has a housing and an input device. The housing includes an upper housing half and a lower housing half. The upper housing half incorporates the input device. The input device has a flat input surface. The input device may be one that inputs information by using a sheet that can detect electrostatic capacity. Alternatively, it may be one that inputs information by using a pressure sensitive film that can detect pressure.

Japanese Patent Application Publication (KOKAI) No. 11-212665 discloses an electronic apparatus that has a main body and an input unit arranged therein. The housing of the main unit has an opening in the top wall. The input device is provided in the main unit, with its input surface opposing the opening. In this structure, the input surface is contacted directly. Therefore, the input device may be likely to get scratches, and/or damages.

Japanese Patent Application Publication (KOKAI) No. 2002-329978 discloses an electronic apparatus that has a housing and an input unit arranged therein. The housing includes an upper housing half and a lower housing half. The upper housing half has an opening in the top wall. The input device is provided in the upper housing half, with its input surface opposing the opening. A protection sheet and a support member are provided in the upper housing half, too. The protection sheet lies between the top wall and the input surface of the input device. More precisely, the sheet is laid on the inner surface of the top wall, closing the opening of the upper housing half and protecting the input surface against any access of the user's fingers. The input device is interposed between the protection sheet and the support member. The support member that is shaped like a frame secures the input device to the upper housing half. The lower housing half combines with the upper housing half, concealing the input device within the housing.

A manufacturer, however, needs to perform many steps to assemble the electronic apparatus disclosed in this reference. First, an opening is made in the upper housing half. Next, the protecting sheet is secured to the inner surface of the top wall of the upper housing half, to close the opening. Then, the input device and the support member are arranged in the upper housing half such that the support member secures the input device to the upper housing half. Finally, the lower housing half is fastened to the upper housing half, thereby concealing the input device within the housing. Thus, it takes much time labor to assemble the electronic apparatus disclosed in the reference.

BRIEF SUMMARY OF THE INVENTION

Embodiments of the present invention provide an electronic apparatus with a pointing device on the housing.

According to an embodiment of the present invention, an electronic apparatus has a housing and a pointing device. The housing has an outside wall which includes an outer surface exposed outward of said housing, and an operation area in the outer surface. The pointing device has a flat input surface laid on the inner surface of the operation area, and the flat input surface receives input operations through the operation area.

Additional features and advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a side view showing the portable computer in the first embodiment, with a housing partially cut away;

DETAILED DESCRIPTION

Preferred embodiments according to the present invention will be described hereinafter with reference to the accompanying drawings.

Figure 1:
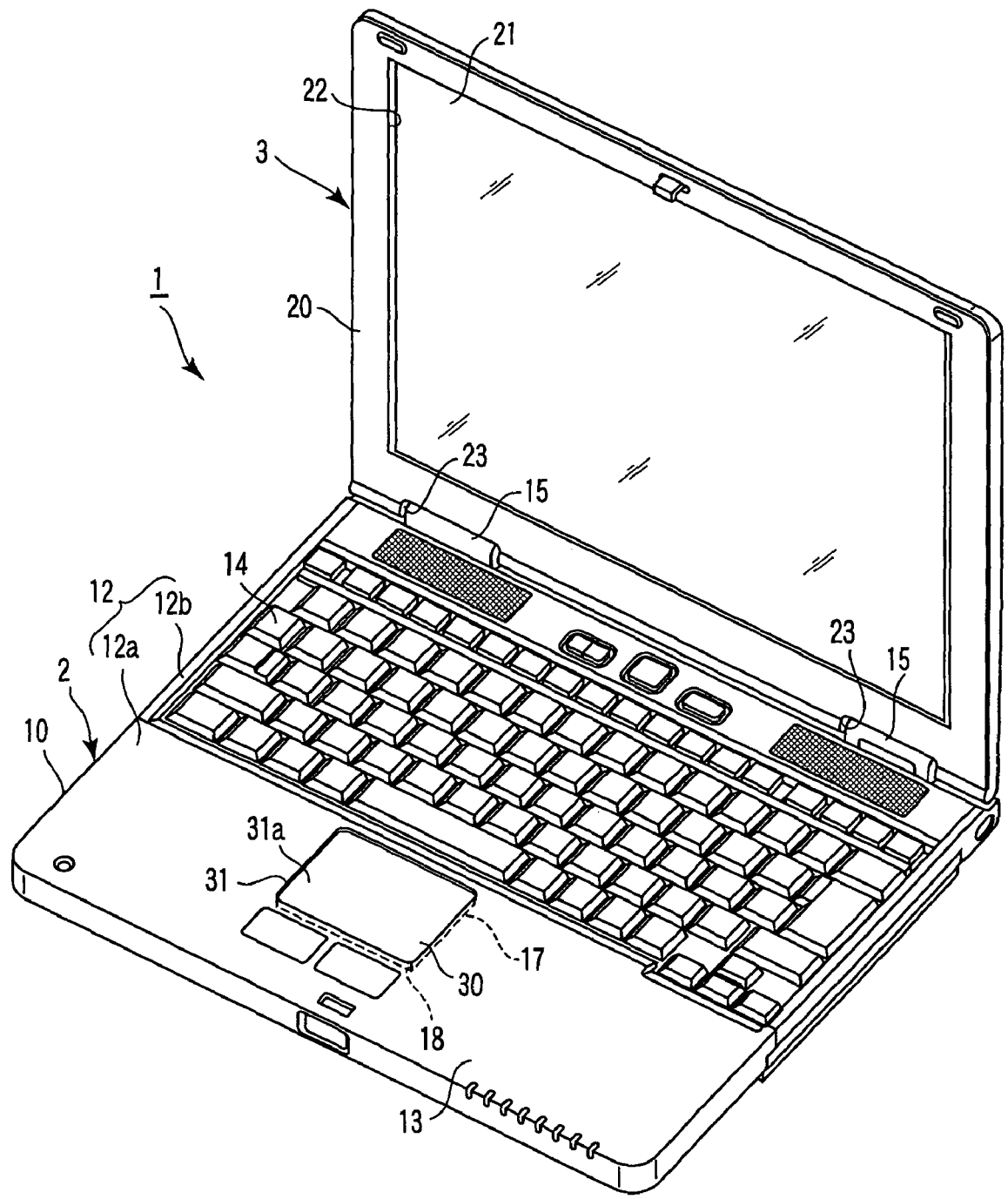
FIG. 1 is a perspective view showing a portable computer according to a first embodiment of the present invention.

FIG. 1 and FIG. 2 show a portable computer 1 as an electronic apparatus. The portable computer 1 includes a main unit 2 and a display unit 3.

The main unit 2 has an opaque colored resin housing 10. The housing 10 has a case 11 and a cover 12, and is formed like a flat box. Therefore, in this embodiment, the outside wall 10c of the housing 10 consists of the case 11 and cover 12. The outside wall 10c has an outer surface 10a and an inner surface 10b. The outer surface 10a is exposed outward of the housing 10.

The cover 12 has a first cover 12a and a second cover 12b. The outside surface of the first cover 12a, which is a part of the outer surface 10a exposed outward of the housing 10, has a palm rest 13. The second cover 12b is located in the rear of the first cover 12a. A keyboard 14 is fitted in the second cover 12b. In the rear end of the second cover 12b, a pair of display supporting feet 15 is provided separately in the width direction of the housing 10. In this embodiment, the cover 12 is composed of a plurality of members (i.e. the first cover 12a and second cover 12b), but the cover 12 may be composed of one member.

A display unit 3 has a display housing 20 and a liquid crystal panel 21 fitted in the display housing 20. In the front wall of the display housing 20, an opening 22 is provided for a display. The opening 22 occupies most of the front wall. Through the opening 22, the display screen of the liquid crystal panel 21 is exposed outward.

The display housing 20 has a pair of connection recesses 23 at one end. These connection recesses 23 consist of the recesses opened forward, downward and rearward of the display housing 20. The connection recesses 23 are located separately in the width direction of the display housing 20, and lead to the feet 15 of the housing 10. These connection recesses 23 are rotatably supported by the feet 15 of the housing 10 via a hinge (not shown).

Thus, the display unit 3 is rotatable between a closed position, covering the palm rest 13 and keyboard 14 from the upper side, and an open position, which exposes the palm rest 13 and keyboard 14. FIG. 1 shows the portable computer 1 in the open position.

Figure 3:
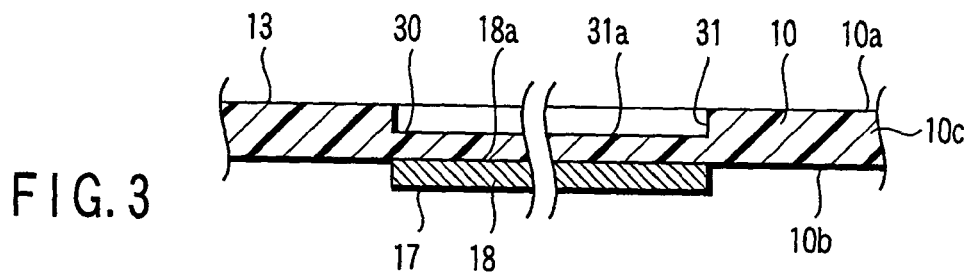
FIG. 3 is a sectional view showing a part close to an operation area of the portable computer in the first embodiment.

A printed wiring board 16, a Hard disk drive (hereinafter HDD, and not shown) and a pointing device 17 as an input device are contained in the housing 10, as shown in FIG. 2 and FIG. 3. The printed wiring board 16 and HDD are screwed to the bottom wall of the housing 10. The pointing device 17 is provided with an input sheet 18 and a driving unit (not shown). The input sheet 18 senses electrostatic capacity, for example, and one side of the sheet is made flat as an input surface 18a. The driving unit is electrically connected to the input sheet 18. The pointing device 17 is contained in the housing 10, with the input surface 18a secured to the inner surface 10b of the housing 10, for example, at the center of the inside of the cover 12a.

As mentioned above, the housing 10 of the portable computer 1 is made of opaque colored resin. Thus, when the pointing device 17 is contained in the housing 10, an operator cannot usually see the position of the input surface 18a from the outside of the housing 10. In this embodiment, the portable computer 1 has an operation area 30 for input operations at the position corresponding to at least a part of the pointing device 17 in the outer surface 10a of the housing 10.

In the portable computer 1, the input sheet 18 is laid on the center of the inside of the first cover 12a, the operation area 30 is provided at the center of the palm rest 13 that is the outer surface of the first cover 12a. In this embodiment, the operation area 30 is provided at the position corresponding to substantially whole surface of the input surface 18a.

The operation area 30 may be distinguishable from the surrounding area by the sense of sight or touch. The operation area 30 may be realized by providing a recess 31 formed so that an end-face (bottom) 31a of the recess 31 has substantially the same area as the input surface 18a. Namely, an operator operates the end-face 31a of the recess 31 as the operation area 30.

The position corresponding to the operation area 30 of the inner surface 10b of the housing 10 is at the same level as the surrounding area in this embodiment, as shown in FIG. 3. Alternatively, the position corresponding to the operation area 30 of the inner surface 10b of the housing 10 may have its surface distinguished from the surrounding area as by means of a surface discontinuity at the boundary of the surrounding area and operation area.

In the portable computer 1, the pointing device 17 is contained in the housing 10 as described below. First, the input sheet 18 is electrically connected to the driving unit. It is possible as mentioned later to first secure the input sheet 18 to the inner surface 10b of the housing 10, and then connect the input sheet 18 electrically to the driving unit.

The input surface 18a of the input sheet 18 may be secured, with an adhesive or the like, at the position corresponding to the operation area 30 of the inner surface 10b of the housing 10, i.e. the inner surface of the first cover 12a. An adhesive layer may be pre-formed on the input surface 18a. The first cover 12a secured to the pointing device 17 and the second cover 12b, fitted with the keyboard 14, are fixed to the case 11. The pointing device 17 is contained in the housing 10 by the above steps.

As the pointing device 17 is contained in the housing 10 with the input surface 18a laid on the inner surface 10b, a separate cover to protect the input surface 18a is unnecessary since a portion of the outside wall 10c provides a protection function. Therefore, the facility of containing the pointing device in the housing 10 may be enhanced. Further, as a separate protection cover of the input surface 18a may be omitted, the portable computer 1 may be made lighter.

Further, in the portable computer 1, the pointing device 17 is fixed to the housing 10 by sticking the input sheet 18 to the inner surface 10b of the housing 10. Therefore, not only the protection cover, but also a mechanical fixing member for fixing the pointing device 17 to the housing 10, may be omitted. Therefore, the portable computer 1 may be still further improved both in terms of ease of assembly and weight.

Moreover, in the portable computer 1, the operation area 30 for input operations is provided at the position corresponding to at least a part of the pointing device 17 in the outer surface 10a of the housing 10. Thus, even if the pointing device 17 is contained in the housing 10 with the input surface 18*a* laid on the inner surface 10*b*, the position of the input surface 18*a* may be distinguished from the outside of the housing 10, providing good operability.

Further, the operation area 30 may be distinguished from the surrounding area by the sense of sight or touch. It is unnecessary to provide an opening in the housing 10 to expose the pointing device 17. Therefore, the design flexibility and design itself of the housing 10 will be improved.

Further, the operation area 30 may be provided in the outer surface 10*a* of the housing 10 by forming a recess 31 at a predetermined position when molding the housing 10, for example. Namely, the number of manufacturing processes for forming the operation area 30 may be reduced, simplifying its structure.

Making the housing 10 of resin is preferable considering the possibility of adversely influencing the operation of the pointing device 17, when the input surface 18*a* of the input sheet 18 to sense electrostatic capacity contactings the housing 10. The palm rest 13 is provided in the outer surface 10*a* of the housing 10, and the operation area 30 is provided in the palm rest 13, improving the operability of the pointing device 17.

Figure 4:
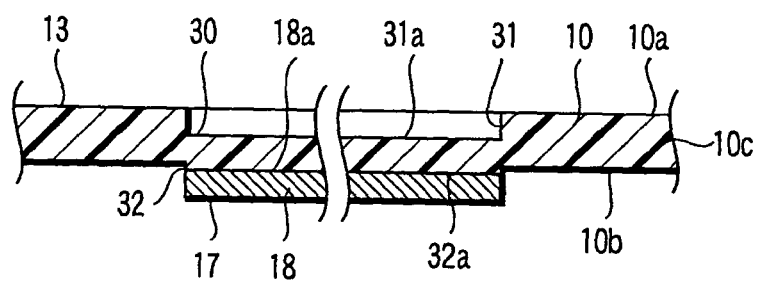
FIG. 4 is a sectional view showing a part close to an operational area of a portable computer according to a second embodiment of the present invention.

FIG. 4 shows a second embodiment of the present invention. In this embodiment, a projection 32 is formed in the inner surface 10*b* of the housing 10 when molding the housing 10, so that the end-face (lower side) 32*a* becomes substantially the same area as the input surface 18*a*. The other structures of a personal computer 1 in this embodiment than the projection 32 are the same as that of the first embodiment. The same reference numerals are given to the same parts, therefore description of those parts will be omitted.

In this structure, it is easy to align the position of the input sheet 18 with the operation area 30 when laying the input surface 18*a* over the inner surface 10*b* of the housing 10.

Figure 5:
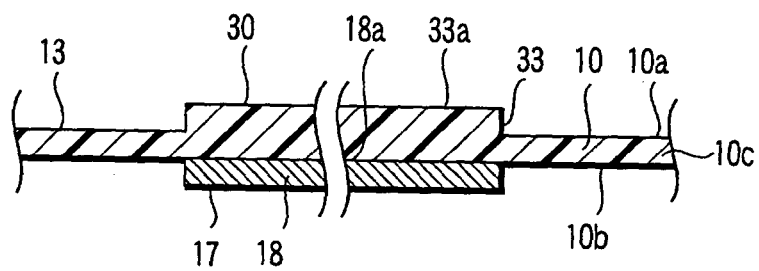
FIG. 5 is a sectional view showing a part close to an operational area of a portable computer according to a third embodiment of the present invention.

Next, a third embodiment of the present invention will be described with reference to FIG. 5.

In the portable computer 1, the operation area 30 has a projection 33. Namely, the end-face (upper surface) 33*a* of the projection 33 becomes the operation area 30. The projection 33 may be formed so that the end-face 33*a* has substantially the same area as the input surface 18*a*. The position corresponding to the operation area 30 in the inner surface 10*b* of the housing 10 may be at the same level as the surrounding area, as shown in FIG. 5. Alternatively, the position corresponding to the operation area 30 in the inner surface 10*b* of the housing 10 may have its surface distinguished from the surrounding area as by means of a surface discontinuity at the boundary of the surrounding area and operation area. FIG. 4 is only one example of such a surface boundary discontinuity. Other examples include having the operation area 30 recessed as in FIG. 7, having a different texture or color region for the operation area as compared to the surrounding area or any other way to permit facile recognition of the operation area. Such facile recognition of the operation area permits application of the input sheet 18 to be easily positioned at the appropriate location for securing same to the operation area on the inner surface 10*b*.

The rest of the configuration, including the parts not shown, is the same as in the above-mentioned first embodiment. The same reference numerals are given to the same parts, therefore description of those parts will be omitted.

According to this embodiment, the same effect as the first embodiment may be obtained. The operation area 30 is provided in the outer surface 10*a* of the housing 10, by forming the projection 33 at a predetermined position when molding the housing 10. Namely, the number of manufacturing processes for forming the operation area 30 may be reduced, simplifying its structure.

Figure 6:
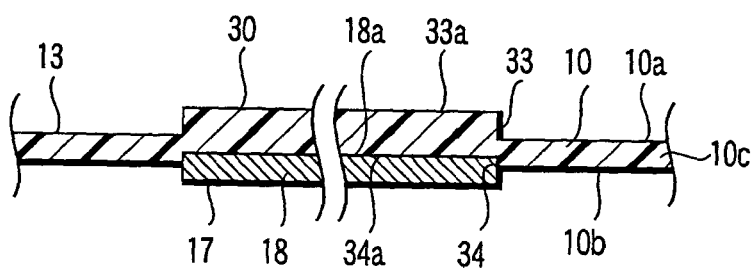
FIG. 6 is a sectional view showing a part close to an operational area of a portable computer according to a fourth embodiment of the present invention.

FIG. 6 shows a fourth embodiment of the present invention. In this embodiment, a recess 34 in the inner surface 10*b* of the housing 10 is formed, so that the end-face (bottom) 34*a* has substantially the same area as the input surface 18*a*. In this structure, it is easy to align the position of the input sheet 18 with the operation area 30 when laying the input surface 18*a* over the inner surface 10*b* of the housing 10. As the rest of the configuration is the same as in the above-mentioned third embodiment, the same reference numerals are given to the same parts, and description of those parts will be omitted.

Figure 7:
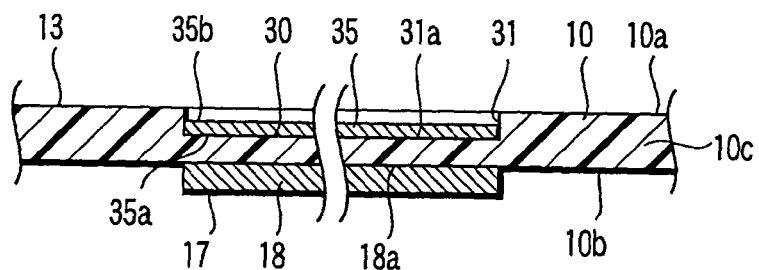
FIG. 7 is a sectional view showing a part close to an operational area of a portable computer according to a fifth embodiment of the present invention.

Hereinafter, a fifth embodiment of the present invention, or a portable computer 1, will be described with reference to FIG. 7.

In the portable computer 1, the operation area 30 has the recess 31, and a sticker 35 to indicate the operation area 30 is stuck to the operation area 30. The sticker 35 covers substantially the whole area of the end-face 31*a* of the recess 31.

The sticker 35 may be a paper or resin film having adhesive in one side 35*a*. The other side 35*b* of the sticker 35 having no adhesive may be colored and/or printed with patterns.

As described in the third embodiment, when the operation area 30 has the projection 33, the sticker 35 may be stuck to the end-face 33*a* of the projection 33. Even if the sticker 35 is stuck to the flat outer surface 10*a* of the housing, the seal may indicate the operation area 30. In this case, it is recommended to print the other side 35*b* of the sticker 35 with different colors and/or patterns from the outer surface 10*a* of the housing 10. The rest of the configuration, including the parts not shown, is the same as that in the above-mentioned first embodiment. The same reference numerals are given to the same parts, therefore description of these parts will be omitted.

According to this embodiment, the same effect as the first embodiment may be obtained. Desired colors and/or patterns may be printed on the sticker 35 to indicate the operation area 30, and the design of the housing 10 may be improved.

Figure 8:
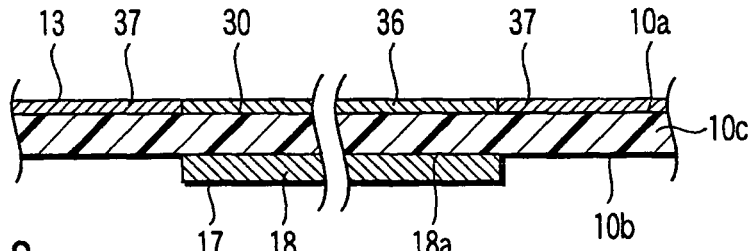
FIG. 8 is a sectional view showing a part close to an operational area of a portable computer according to a sixth embodiment of the present invention.

A sixth embodiment of the invention will be described referring to FIG. 8.

A portable computer 1 is provided with a first painted layer 36 in the operation area 30 to indicate the operation area 30. In the areas other than the operation area 30, a second painted layer 37 with colors or print different from the first painted layer is provided.

The operation area 30 may be formed to be at the same level as the surrounding area. When the operation area 30 has the recess 31 or the projection 33, as in the first or third embodiment, the first painted layer 36 may be provided in the end-face 31*a* of the recess 31 or the end-face 33*a* of the projection 33. The second painted layer 37 is omissible.

The rest of the configuration, including the parts not shown, is the same as that in the above-mentioned first embodiment. The same reference numerals are given to the same parts, and their description will be omitted. According to this embodiment, the same effect as the first embodiment may be obtained.

It is possible to provide the second painted layer 37 with a different color from the housing 10, and to omit the first painted layer 36. In this structure, the operation area 30 is the same color as the housing 10, and is discriminated from the other areas with the same color by being framed by the second painted layer 37.

Figure 9:
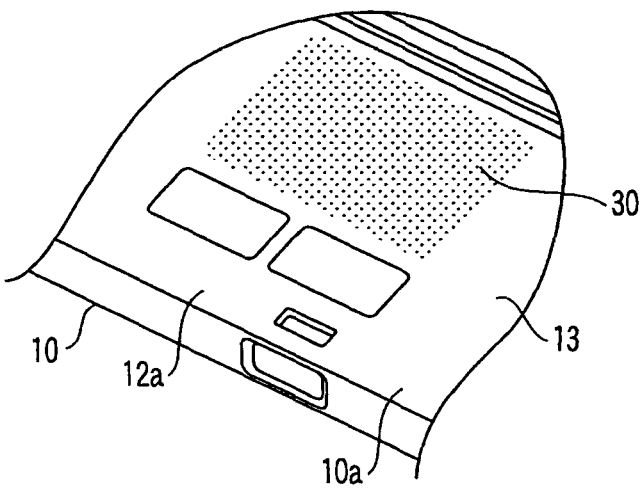
FIG. 9 is a perspective view showing a part close to an operation area of a portable computer according to a seventh embodiment of the present invention.
Figure 10:
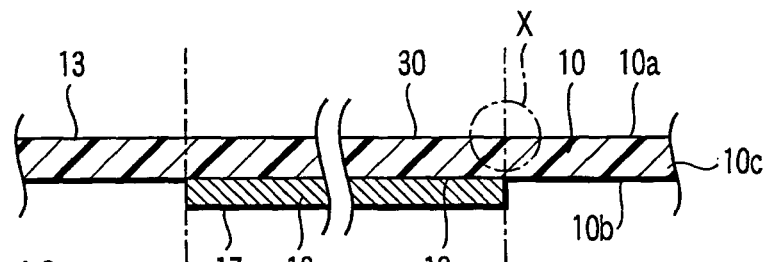
FIG. 10 is a sectional view showing the part close to the operational area in the seventh embodiment.
Figure 11:
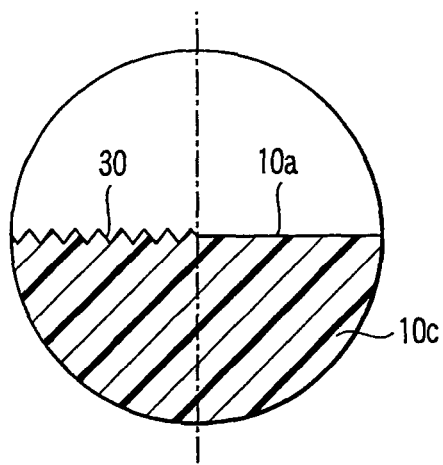
FIG. 11 is a magnified sectional view showing the area enclosed by the chain line X in FIG. 10 in the seventh embodiment.

FIG. 9 through FIG. 11 show a portable computer 1 as a seventh embodiment of the invention.

The operation area 30 in the portable computer 1 is made with a different surface roughness from at least the surrounding area. When the operation area 30 has the recess 31 or the projection 33, as in the first or third embodiment, the end-face 31a of the recess 31 or the end-face 33a of the projection 33 may be made with different surface roughness from the surrounding area. The areas other than the operation area 30 may be made with a different surface roughness from the operation area 30, or may be made without a rough surface. Further, the surface of the operation area 30 may not be rough, and the area other than the operation area 30 may be made with a predetermined surface roughness.

In this embodiment, the outer surface 10a of the housing 10 is made flat, and only the operation area 30 is made with a desired surface roughness. FIG. 11 shows the surface condition of the operation area 30 with that of the outer surface 10a next to the operation area 30, magnifying a part of the housing 10 shown in FIG. 10. The rest of the configuration, including the parts not shown, is the same as the above-mentioned first embodiment. The same reference numerals are given to the same parts, and their description will be omitted.

Figure 12:
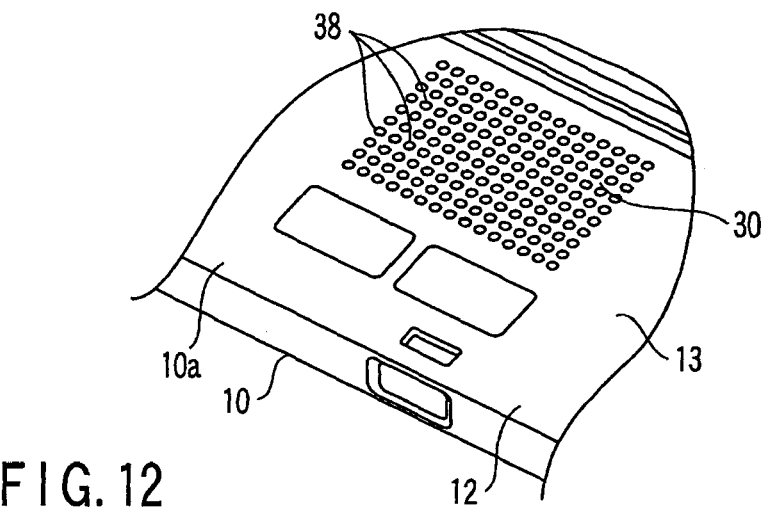
FIG. 12 is a perspective view showing a part close to an operation area of a portable computer according to an eighth embodiment of the present invention.
Figure 13:
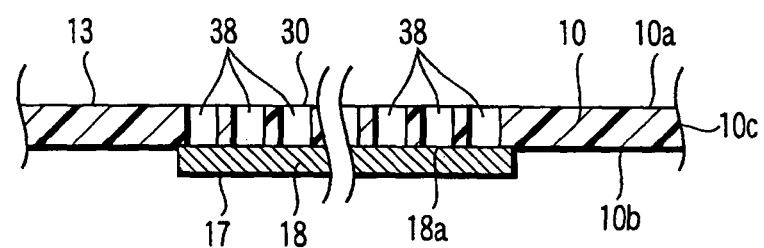
FIG. 13 is a sectional view showing the part close to the operational area in the eighth embodiment.

Hereinafter, an eighth embodiment of the invention, or a portable computer 1, will be described with reference to FIG. 12 and FIG. 13.

In the portable computer 1, the operation area 30 is made to be at the same level as the surrounding area and to have a mesh-like surface. Providing a circular or polygonal hole 38 with a predetermined interval in the operation area 30 of the outside wall 10c forms the mesh part. The size, shape and interval of the holes 38 are determined so as to distinguishable from the surrounding area. In this embodiment, the outer surface 10a of the housing 10 is made flat. The rest of the configuration, including the parts not shown, is the same as the above-mentioned first embodiment. The same reference numerals are given to the same parts, and their description will be omitted.

Figure 14:
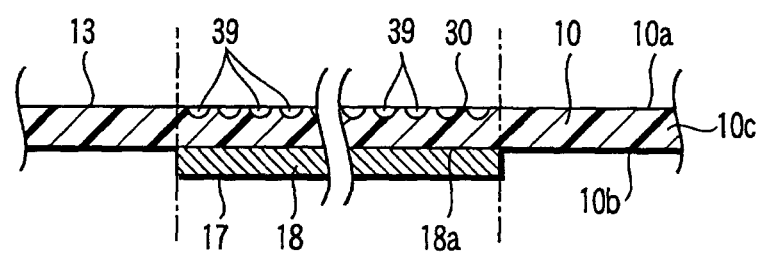
FIG. 14 is a sectional view showing a part close to an operational area of a portable computer according to a ninth embodiment of the present invention.

Next, a ninth embodiment of the invention, or a portable computer 1, will be described with reference to FIG. 14.

In the portable computer 1, the operation area 30 is made to be at the same level as the surrounding area and to have a plurality of hemispheric recesses 39 at a predetermined interval. The size, shape and interval of these recesses 39 are determined so as to distinguishable from the surrounding area as well as the holes of eighth embodiment. The rest of the configuration, including the parts not shown, is the same as the above-mentioned first embodiment. The same reference numerals are given to the same parts, and their description will be omitted.

Figure 15:
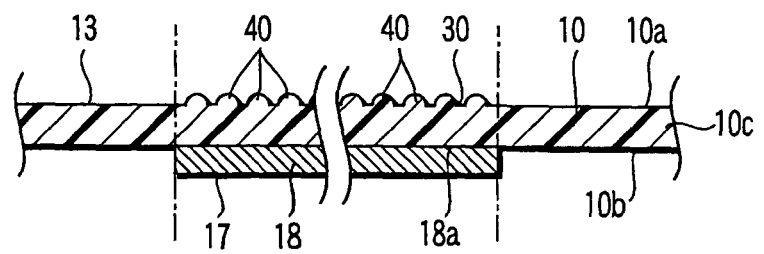
FIG. 15 is a sectional view showing a part close to an operational area of a portable computer according to a tenth embodiment of the present invention.

FIG. 15 shows a portable computer 1 described as a tenth embodiment of the invention.

The operation area 30 in the portable computer 1 is made to be at the same level as the surrounding area and to have a plurality of hemispheric projections 40 at a predetermined interval. The size, shape and interval of these projections 40 are determined so as to distinguishable from the surrounding area. The rest of the configuration, including the parts not shown, is the same as the above-mentioned first embodiment. The same reference numerals are given to the same parts, and their description will be omitted.

When the operation area 30 has the recess 31 or the projection 33, as in the first or third embodiment, the mesh part in the eighth embodiment, the plurality of recesses 39 in the ninth embodiment, and the plurality of projections 40 in the tenth embodiment may be formed in the end-face 31a of the recess 31 or the end-face 33a of the projection 33.

A eleventh embodiment of the invention, or a portable computer 1, will be described with reference to FIG. 16.

Figure 16:
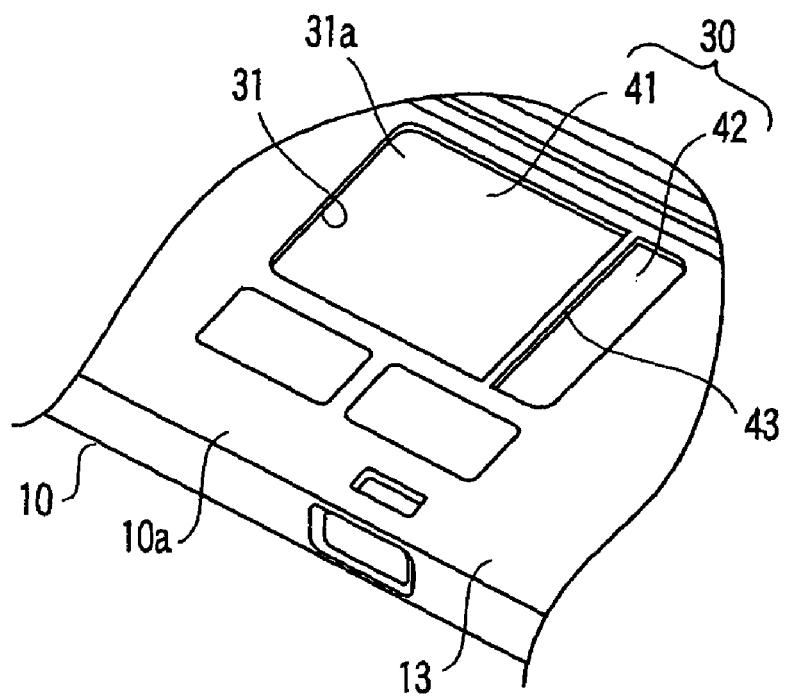
FIG. 16 is a perspective view showing a part close to an operation area of a portable computer according to an eleventh embodiment of the present invention.

As shown in FIG. 16, the portable computer 1 has a pointing device 17, which is used as an input device. The pointing device 17, the input sheet 18 consists of many input sections, for example, two input sections (not shown) of first input section and second input section. The first input section is used to perform an input operation, such as moving a pointer on the display screen. The second input section is used to perform another input operation, such as scrolling the screen.

The operation area 30 of the pointer device 17 also consists of two sections of first operation section 41 and second operation section 42. The first operation section 41 is associated with the first input section of the input sheet 18. The second operation section 42 is associated with the second input section of the input sheet 18.

In this embodiment, the operation area 30 has a recess 31. The recess 31 is provided with a rib 43 to divide the first and second operation sections 41 and 42. The same reference numerals are given to the same parts as in the first embodiment, and their description will be omitted.

The number of input sections in the input sheet 18 is optional. The operation sections may be divided corresponding to a part or all of the input sections. The operation sections may be divided not only by a rib, but also by a groove, seal, paint, mesh, surface roughness, multiple recesses, multiple projections, or combination of the above, to be distinguishable from the adjacent operation section. Further, the operation area 30 may not have the recess 31, may have the projection 33, or may be made to be at the same level as the surrounding area. In either case, the operation section may be made distinguishable from the adjacent operation section by a rib, a groove, seal, painting, mesh, surface roughness, multiple recesses, multiple projections, or combination of the above.

Figure 17:
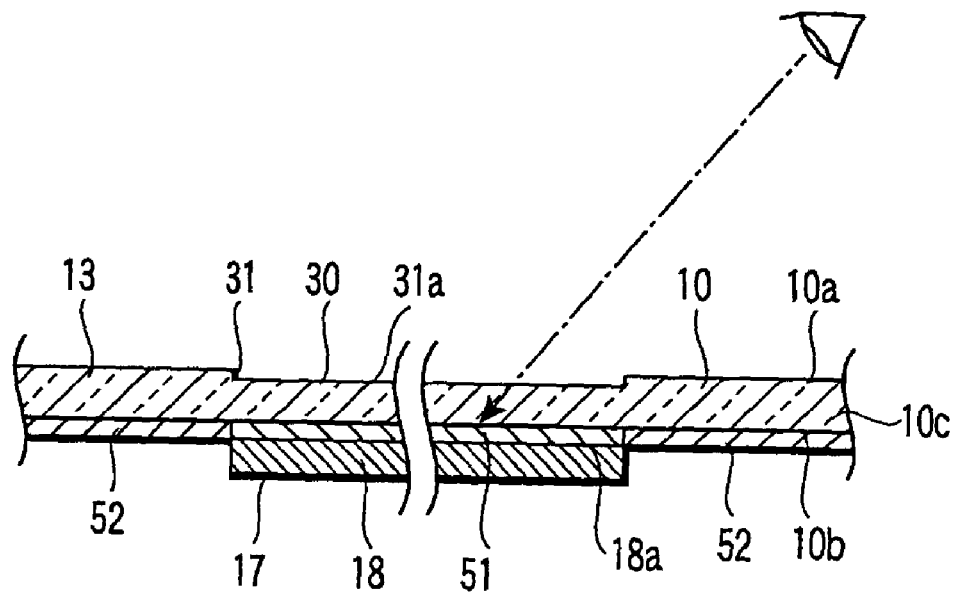
FIG. 17 is a sectional view showing a part close to an operational area of a portable computer according to a twelfth embodiment of the present invention.

FIG. 17 shows a portable computer 1 of a twelfth embodiment of the present invention.

The portable computer 1 is provided with a transparent housing 10 having an outside wall 10c. In other words, all of the case 11, first cover 12a, and second cover 12b are made of transparent resin such as acrylic. The housing 10 may be either colorless transparent or colored transparent. Colored transparent includes black transparent and gray transparent, which is an intermediate color between transparent and black transparent, in addition to chromatic transparent such as red transparent, blue transparent and yellow transparent.

A first colored layer 51 is provided at least on a part of the pointing device 17 in the inner surface 10b of the housing 10 at the position corresponding to substantially all areas of the input surface 18a. A second colored layer 52 with a different color from the first colored layer 51 is provided at the position other than the position corresponding to the input surface 18a in the inner surface 10b of the housing 10. The colored layers 51 and 52 may be either opaque or transparent. The color mentioned here includes not only chromatic colors, but also achromatic colors such as black, white and gray. These colored layers 51 and 52 may be provided by a seal or by paint.

The operation area 30 for the input operations may be provided at least on a part of the pointing device 17 in the inner surface 10b of the housing 10, for example, at the position corresponding to substantially the whole area of the input surface 18a. The operation area 30 may be distinguishable from the surrounding area by the sense of sight or touch, and may be applied to any operation area 30 described in the first to eleventh embodiments.

In this embodiment, the operation area 30 has the recess 31. The position of the input surface 18a of the pointing device 17 may be distinguished by the first colored layer 51, and the operation area 30, like the recess 31, may be omitted. The rest of the configuration, including the parts not shown, is the same as in the above-mentioned first embodiment. The same reference numerals are given to the same parts, and their description will be omitted.

The housing 10 in this embodiment is transparent, and the first colored layer 51 provided in the inner surface 10b of the housing 10 may be visually identified through the housing 10. The first colored layer 51 is provided at the position corresponding to at least a part of the pointing device 17, and the position of the pointing device 17 may be distinguished by the colored layer 51 also from the outside of the housing 10.

By the way, although the whole housing 10 is transparent in this embodiment, it is possible to merely make at least the part provided with the operation area 30 transparent. For example, when the operation area 30 is provided in the palm rest 13, at least the first cover 12a may be made of a transparent material.

Moreover, the same function and effect as those in the twelfth embodiment may be obtained even though the second colored layer 52 is omitted and the first colored layer 51 is provided with a different color from the housing 10 in at least a part of the pointing device 17.

Further, the same function and effect as those in the twelfth embodiment may be obtained by omitting the first colored layer 51 and providing the second colored layer 52 with a different color from the housing 10 in the area excluding at least a part of the pointing device 17.

The present invention is not restricted to the above-mentioned first through twelfth embodiments. The input surface 18a of the pointing device 17 may be laid on any part of the inner surface 10b of the housing 10. The operation area 30 may be provided at a position corresponding to at least a part of the pointing device 17.

An electronic apparatus according to the present invention is not limited to a portable computer, and is applicable to a wide variety of electronic apparatuses, including an electronic diary and PDA.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An electronic apparatus, comprising:
a housing which contains an electronic component therein, and has an outside wall which has an exterior surface exposed outward of said housing and an interior surface exposed inward of the housing, the housing having an operation area in the exterior surface;
a pointing device disposed entirely inside the housing, having a flat input surface secured with an adhesive to the interior surface of the outside wall adjacent the operation area so that no portion of the flat input surface is exposed as the outside wall of said housing, the outside wall being larger than the flat input surface, the flat input surface receiving input operations through the operation area; and
a colored sticker stuck to the operation area.

2. An electronic apparatus according to claim 1, wherein the operation area has a recess formed on the exterior surface.

3. An electronic apparatus according to claim 1, wherein the operation area has a projection formed on the exterior surface.

4. An electronic apparatus according to claim 1, further comprising a painted layer that is provided in the operation area.

5. An electronic apparatus according to claim 1, wherein the operation area is made with a surface roughness different from a surrounding area.

6. An electronic apparatus according to claim 1, wherein the operation area has a mesh portion.

7. An electronic apparatus according to claim 1, wherein the operation area has a plurality of recesses provided therein.

8. An electronic apparatus according to claim 1, wherein the operation area has a plurality of projections provided therein.

9. An electronic apparatus according to claim 1, wherein the operation area has a first operation area for first operation, and a second operation area provided separately from said first operation area, for second operation.

10. An electronic apparatus, comprising:
a housing having a transparent outside wall which has an interior surface;
a pointing device arranged in said housing, the pointing device having a flat input surface laid on the interior surface of the outside wall; and
a colored layer provided at a position corresponding to at least a part of said pointing device of said housing,
wherein a color of the colored layer being different from a color of a area surrounding the position.

11. An electronic apparatus according to claim 10, wherein said housing is made of a resin.

12. An electronic apparatus according to claim 10, wherein the transparent outside wall has an exterior surface exposed outward of said housing, and an operation area provided at the position corresponding to the colored area in the exterior surface.

13. An electronic apparatus, according to claim 12, wherein the operation area has a recess formed on the exterior surface.

14. An electronic apparatus according to claim 12, wherein the exterior surface has a palm rest in which the operation area is provided.

15. An electronic apparatus, comprising:
a housing which contains an electronic component therein, and has an outside wall which has an exterior surface and an interior surface exposed inward of the housing;
a pointing device arranged inside of said housing, the pointing device having a flat input surface secured with an adhesive on the interior surface of the outside wall, so that no portion of the flat input surface is exposed as the outside wall of said housing, the outside wall being larger than the flat input surface, the flat input surface receiving input operations through the outside wall; and
a sticker stuck on the exterior surface of the outside wall opposite to the interior surface on which the flat input surface of the pointing device is secured.

16. An electronic apparatus according to claim 15, wherein the sticker is a colored sticker.

17. An electronic apparatus according to claim 15, further comprising a recess formed on the exterior surface of the outside wall, wherein the sticker covers the recess, and the flat input surface of the pointing device is secured on the interior surface opposing the recess.

18. An electronic apparatus according to claim 15, wherein the sticker is printed with a pattern.

19. An electronic apparatus according to claim 18, further comprising a recess formed on the exterior surface of the outside wall, wherein the sticker covers the recess, and the flat input surface of the pointing device is laid on the interior surface opposing the recess.

20. An electronic apparatus, comprising:
- a housing which contains an electronic component therein, and has an outside wall which has an exterior surface exposed outward of said housing and an interior surface exposed inward of the housing, the housing having an operation area in the exterior surface;
- a pointing device disposed inside of the housing, having a flat input surface secured with an adhesive on the interior surface of the outside wall, said adhesive interposed between said flat input surface of the pointing device and the interior surface of the outside wall and aligned with the operation area so that no portion of the flat input surface is exposed as the outside wall of said housing, the outside wall being larger than the flat input surface, the flat input surface receiving input operations through the operation area.

21. An electronic apparatus according to claim 20, wherein the operation area has a recess formed on the exterior surface.

22. An electronic apparatus according to claim 21, further comprising, a colored sticker positioned in the recess.

* * * * *